US006990608B2

(12) United States Patent
Wisler et al.

(10) Patent No.: US 6,990,608 B2
(45) Date of Patent: Jan. 24, 2006

(54) METHOD FOR HANDLING NODE FAILURES AND RELOADS IN A FAULT TOLERANT CLUSTERED DATABASE SUPPORTING TRANSACTION REGISTRATION AND FAULT-IN LOGIC

(75) Inventors: Trina R. Wisler, Tigard, OR (US); Jim B. Tate, Glendale, AZ (US); David C. Hege, San Jose, CA (US); Charles Stuart Johnson, San Jose, CA (US); David J. Wisler, Tigard, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 571 days.

(21) Appl. No.: 10/302,628

(22) Filed: Nov. 21, 2002

(65) Prior Publication Data

US 2003/0204775 A1 Oct. 30, 2003

Related U.S. Application Data

(60) Provisional application No. 60/375,783, filed on Apr. 25, 2002, provisional application No. 60/375,703, filed on Apr. 25, 2002.

(51) Int. Cl.
*G06F 11/00* (2006.01)
(52) U.S. Cl. .............................. 714/13; 714/4; 714/11; 707/202
(58) Field of Classification Search .................. 714/13, 714/4, 15, 11, 20; 718/101; 707/202
See application file for complete search history.

(56) References Cited

U.S. PATENT DOCUMENTS

| 5,923,833 | A | * | 7/1999 | Freund et al. ................ 714/19 |
| 6,389,551 | B1 | * | 5/2002 | Yount ............................ 714/4 |
| 6,490,693 | B1 | * | 12/2002 | Briskey et al. ............... 714/15 |
| 6,901,533 | B2 | * | 5/2005 | Chen et al. ................... 714/16 |
| 2002/0035590 | A1 | * | 3/2002 | Eibach et al. ............... 709/101 |
| 2002/0145983 | A1 | * | 10/2002 | Block et al. ................ 370/254 |

* cited by examiner

*Primary Examiner*—Robert Beausoliel
*Assistant Examiner*—Marc Duncan

(57) ABSTRACT

A modified transaction registration protocol is disclosed. The registration protocol is inherently centralized in that processes requesting registration to participate in the work of a transaction, must send a request to a Broadcast Owner CPU which is the CPU that initiated the transaction. The processes wait, suspended, until a response is received from the Broadcast Owner CPU. However, if the Broadcast Owner CPU fails to respond to the registration request, then the processes that are waiting are incapable performing work for the transaction. While a CPU failure may not occur often, in a fault-tolerant system, such events must be accounted for. Therefore, the transaction registration protocol is modified to revert to a Full Broadcast transaction protocol and complete any outstanding registration requests. This is accomplished by distributing transactions to all of the CPUs in the system, and in each CPU forcing the completion of registration requests in each CPU.

8 Claims, 8 Drawing Sheets

METHOD FOR HANDLING NODE FAILURES AND RELOADS IN A FAULT TOLERANT CLUSTERED DATABASE SUPPORTING TRANSACTION REGISTRATION AND FAULT-IN LOGIC

CROSS-REFERENCE TO RELATED APPLICATIONS

This application claims priority to U.S. Provisional Application, entitled "HYBRID METHOD FOR FLUSHING TRANSACTION STATE IN A FAULT-TOLERANT CLUSTERED DATABASE", filed on Apr. 25, 2002, Ser. No. 60/375,703, which is incorporated by reference into the present application.

This application claims priority to U.S. Provisional Application, entitled "METHOD FOR HANDLING NODE FAILURES AND RELOADS IN A FAULT TOLERANT CLUSTERED DATABASE SUPPORTING TRANSACTION REGISTRATION AND FAULT-IN LOGIC", filed on Apr. 25, 2002, Ser. No. 60/375,783, which is incorporated by reference into the present application.

FIELD OF THE INVENTION

The present invention is generally related to handling cluster failures in a transaction processing system and more particularly to handing processing unit failures and reloads in a cluster while executing a transaction registration protocol.

DESCRIPTION OF THE RELATED ART

Current transaction processing systems have better performance when using a transaction registration protocol, herein after called the Basic Registration Protocol. This performance improvement comes from limiting the number of agents that need to be involved in transaction processing messages that occur during the course of a transaction flush to the log. However, if a cluster failure occurs, the registration protocol can fail. Thus, there is a need for an improved protocol that incorporates a registration protocol but handles cluster failures as well.

FIG. 1 shows the phases of the Basic Registration Protocol described in related U.S. Application, entitled "HYBRID METHOD FOR FLUSHING TRANSACTION STATE IN A FAULT-TOLERANT CLUSTERED DATABASE, and incorporated by reference into the present application. There are four phases of The Basic Registration protocol, a Begin Transaction Phase, a DP Check In Phase, a Phase 1 Flush, and a Phase 2 Lock Release Phase. The Basic Registration Protocol does not require a full broadcast to all CPUs for the Phase 1 flush (which ends the application phase of a transaction). Only CPUs that participated in the transaction need be involved in the Phase 1 flush. This is accomplished by requiring that a CPU register with the Broadcast owner of the transaction when a process resident on that CPU needs to participate in the transaction. A process attempting to participate in a transaction is placed on a PermissionWaiter list for the transaction. The elements of the PermissionWaiter list represent processes on a CPU that are waiting for a Registration response for the transaction from the Broadcast Owner. The elements of the Permission-Waiter list are connected to a transaction control block (TCB) for the transaction and the TCB is placed on a WaiterInUse list along with any other TCBs whose transactions have processes awaiting a registration response.

If the registration is accepted and a response is sent back to the requesting CPU, the CPU is added to a Participating CPU list that is maintained by the Broadcast Owner. The process is then removed from the PermissionWaiter list and the TCB is removed from the WaiterInUse list. The response from the Broadcast owner is a response for all of the processes waiting for a Registration response on the CPU, as registration is granted on a per CPU basis.

After the work of the transaction is completed, and the commit phase for the transaction is started, the Broadcast Owner sends a Phase 1 Flush message, in accordance with the Basic Registration Protocol, only to those CPUs that are registered for the transaction. A Phase 2 (lock release) request is also sent only to the same CPUs that receive the Phase 1 Flush message.

The Basic Registration Protocol helps to improve the performance of a transaction processing system in which there are a large number of participating clusters, by cutting down on message traffic within a cluster. However, the Registration protocol is inherently centralized, having a single point of failure in the Broadcast Owner. In particular, if the Broadcast Owner CPU fails, the CPUs having processes that are attempting to register for a transaction block, waiting for response to their Registration requests. Without additional measures being taken, the Basic Registration Protocol does not handle this situation, causing the transaction system to be vulnerable to a CPU failure in which the Broadcast Owner is lost.

Also during a CPU Reload operation, special care must be taken for those transactions that have processes in the middle of a Registration. During a CPU Reload operation, a down CPU is brought back to become a running CPU. If the CPU being reloaded had processes that were attempting to participate in a transaction or if the CPU being reloaded was a Broadcast Owner CPU, then outstanding Registration Requests must be responded to or the system is again not completely fault-tolerant.

Consequently, there is a need for an improved protocol to handle CPU failures and reloads while operating with the Basic Registration Protocol.

BRIEF SUMMARY OF THE INVENTION

The present invention is directed towards the above need. One method in accordance with the present invention is a method of handling cluster failures in a transaction processing system operating with a registration protocol. The transaction processing system includes a network of interconnected processing clusters, where each cluster includes a plurality of processing units each having a CPU and volatile storage and access to stable storage. The method includes the steps of receiving, at a processing unit, a message that a processing unit has been reported to be down and one or more network transactions distributed from a broadcast owner of the transactions the processing unit has resident thereon, a first list having elements indicative of transactions with outstanding registration requests, a second list having elements indicative of processes waiting for a registration response for a particular transaction, and a third list having elements indicative of currently running processing units. The method further includes the step of examining the elements of the first list to determine which transactions on the list have outstanding registration requests. For each transaction on the list having an outstanding registration request, if the down processing unit hosted the broadcast owner for the transaction, the method includes receiving any outstanding registration requests sent to the broadcast owner. If the down processing unit did not host the broadcast owner, the method includes examining the elements of the second list for the transaction, to determine whether the down processing unit is a backup processing unit for the processing unit, and if the down processing unit is the backup processing unit, receiving any outstanding registration requests to enable the processing unit to process the loss of its backup processing unit. The method further includes removing the element indicative of the down processing unit from the third list.

A method also in accordance with the present invention includes a method of handling a processing unit reload in a transaction processing system operating with a registration protocol, where the transaction processing system includes a network of interconnected processing clusters, each cluster includes a plurality of processing units, and each has a CPU and volatile storage and access to stable storage. The method includes the steps of receiving, at the processing unit, one or more network transactions from the broadcast owner of the transactions, determining whether a transaction control block (TCB) is present for each network transaction received, and if no TCB is present for a transaction, forming a TCB for the transaction. If there is an outstanding registration request for any network transaction received, the method includes receiving a registration response to the request. The method further includes reloading for the processing unit a messaging module and receiving a message indicating whether the transaction registration protocol is being employed.

One advantage of the present invention is that The Basic Registration Protocol can now be used within a cluster that is tolerant of CPU failures in a cluster. Thus, the benefit of The Basic Registration Protocol can be maintained even in a fault-tolerant environment.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
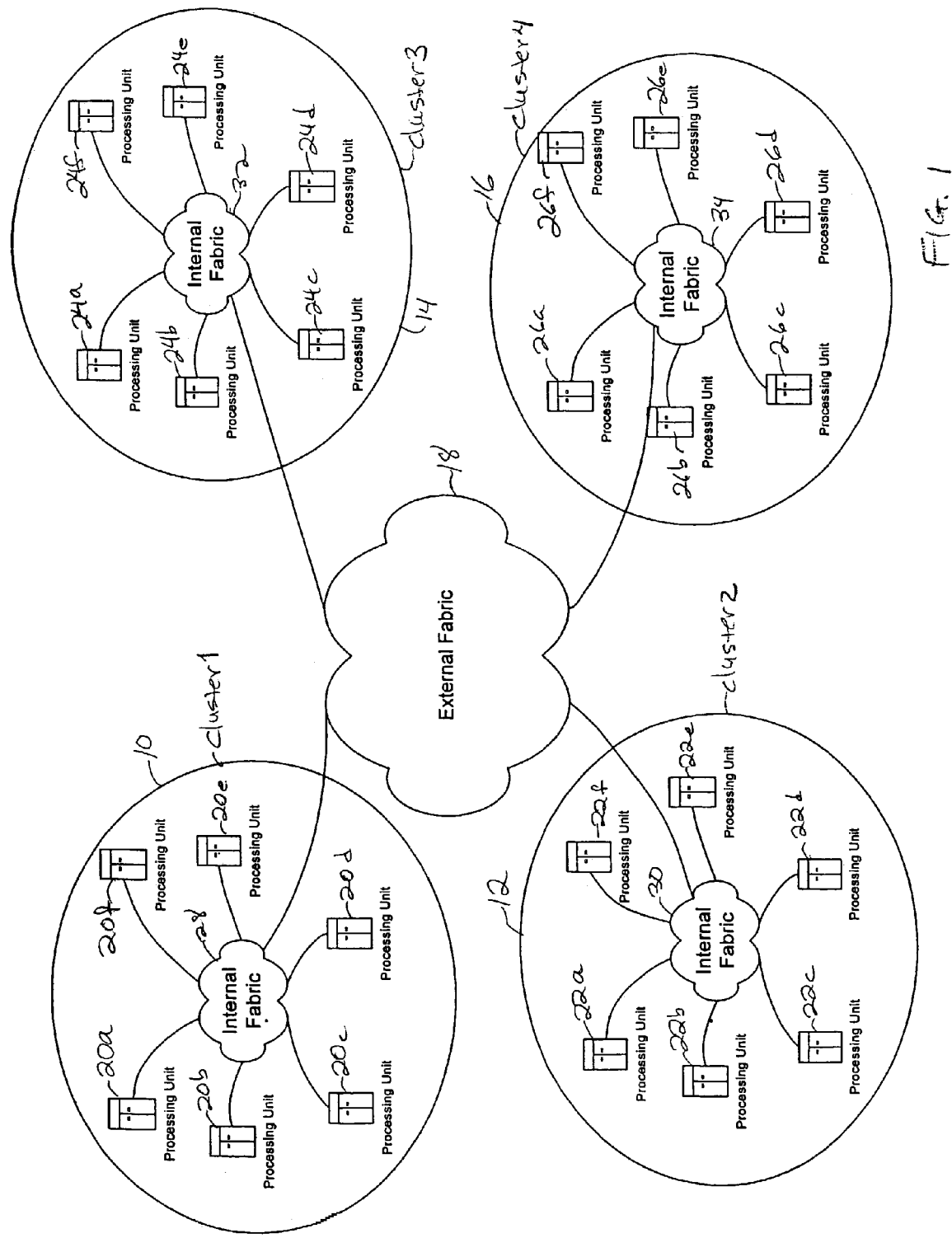
FIG. 1 shows the system setting in which the present invention operates.

FIG. 1 shows a system setting in which the present invention operates. The system includes a plurality of clusters 10, 12, 14, 16 interconnected by an external fabric 18 to form a constellation. Each cluster 10, 12, 14, 16 includes a plurality of processing units 20a–f, 22a–f, 24a–f, 26a–f interconnected by an internal fabric 28, 30, 32, 34, respectively. In some embodiments, a cluster 10, 12, 14, 16 includes up to 16 processing units. The external fabric 18 can be a local-area network or a wide-area network. In one embodiment, the internal fabric and external fabric are similar kinds of networks.

Each cluster has several processes resident therein operating as part of a Transaction Monitor Facility (TMF). These processes include a TMP process pair(TMP-P, TMP-B) for managing distributed transactions, one or more resource manager process pairs (DP-P, DP-B), called disk processes for performing transaction services including commit and abort, a transaction monitor in each processing unit for managing the resource managers of the particular processing unit, an audit process pair for managing one or more recovery logs of the cluster, and when needed, a backout process. Transaction monitors within the cluster cooperate with each other to implement a two-phase commit protocol to commit (or abort) a transaction in which resource managers in the several processing units may have participated. The TMP process pair, as stated above, is responsible for managing distributed transactions, and the TMP process pairs in each cluster of a constellation form a spanning tree which reflects the parent-child relationships of a distributed transaction. The TMP process pairs of each cluster carry out a two-phase commit, presumed abort, protocol for distributed transactions.

The following terms, as described herein, are used throughout the description of the invention. The Transaction Monitor Facility Library (TMFLib) is a library which provides access to and functions for the Transaction Monitor Facility (TMF); TMFLib contains TMF data structures to support that functionality. Packet I/O (PIO) refers to a messaging facility for sending messages between and among CPUs. A TMFSegment is a single memory space shared by the various TMF processes; there is one TMFSegment per CPU. A Transaction Control Block (TCB) is a data structure that maintains information about a single transaction; there is one TCB per transaction per involved CPU. A Transaction Control Table (TCT) is a data structure that keeps information about transactions in a CPU. The address of the TCT is located in the TMFSegment. A broadcast owner (BOwn) is a CPU at which a transaction is initiated. A Transaction ID (TransID) is a global transaction identifier and a TCBRef is a transaction identifier that is specific to a particular cluster.

A network transactions is a distributed transaction that involves one or more clusters to which a branch of the distributed transaction has been exported. A TMP-Owned transaction is either a system startup transaction or a network transaction that originated on a cluster different from the cluster of the TMP-Owned transaction. System startup transactions are those that were in progress when the transaction monitor facility (TMF) went down and are now controlled by the TMP CPU when TMF is restarted.

Figure 2:
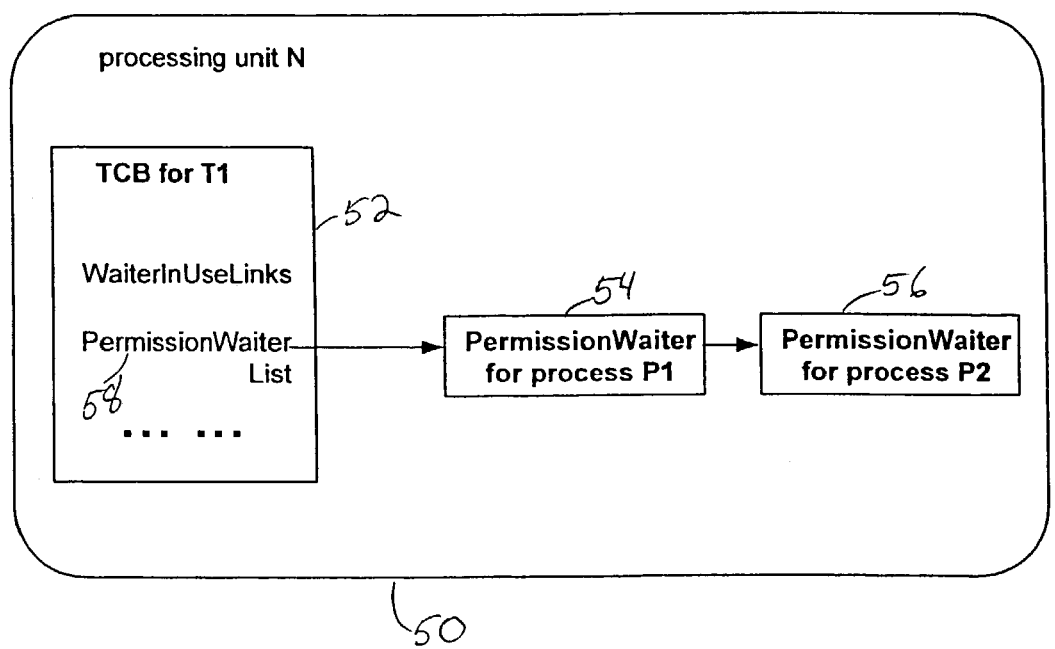
FIG. 2 shows the structure of the Permission Waiter list.
Figure 3:
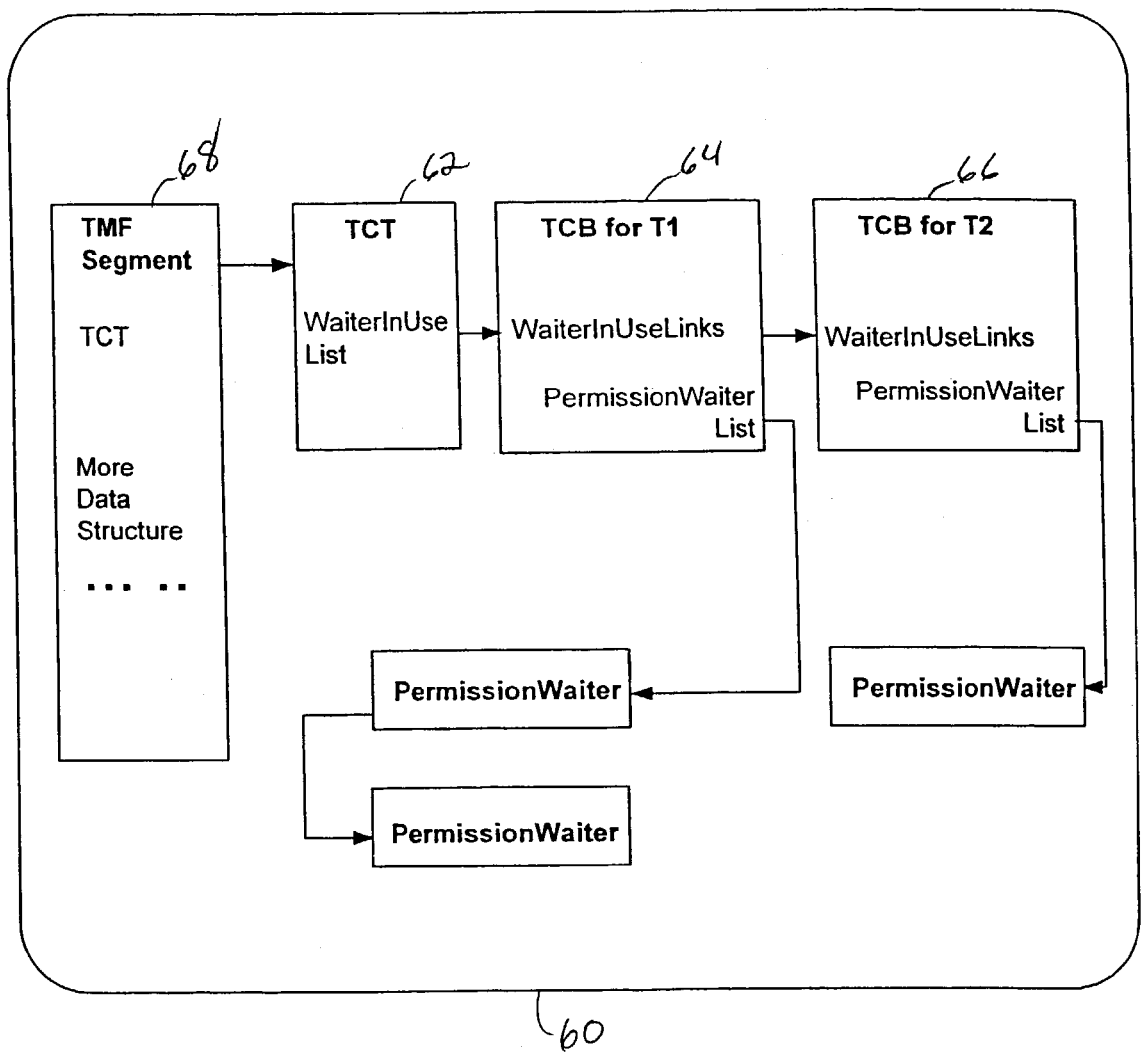
FIG. 3 shows the structure of the WaiterInUse list.

Additionally, in the present invention, there are two important list structures involved, the Permission Waiter list shown in FIG. 2 and the WaiterInUse list shown in FIG. 3.

The Permission Waiter list 50, used in conjunction with the Registration Protocol, has a transaction control block (TCB) 52 for each transaction and one or more Permission-Waiter list elements 54, 56. Each list element 54, 56 identifies a process that has requested to participate in the transaction described by the TCB 52 and is waiting for a Registration response from the transaction initiator, the Broadcast Owner (BOwn). The PermissionWaiter list elements 54, 56 form a linked list whose head element is pointed to by a pointer 58 in the TCB 52. Each time a registration request occurs in a CPU for a particular transaction, the, process making the request is placed on the PermissionWaiter list. A process is removed from the list when the Broadcast Owner has responded to the Registration request. Although only one process per CPU needs to register, all inquiries made by the CPU must wait on the PermissionWaiter list for a Registration response.

In the example shown in FIG. 2, there is one transaction T1 with two processes, P1 and P2 in CPU N, that are waiting for a Registration response from the Broadcast Owner.

FIG. 3 shows the structure of the WaiterInUse list 60. This list includes a Task Control Table (TCT) 62, which maintains information about transactions for a particular CPU, and one or more TCBs 64, 66. A pointer to the TCT 62 is located in a TMF Segment 68 and a pointer to the list elements, the TCBs 64, 66, of the WaiterInUse list 60 is in the TCT 62. A TCB for a transaction is placed on the WaiterInUse list when a process attempts to register with the Broadcast Owner to participate in the transaction described the by the TCB. A TCB is removed from the list when a Registration Request is completed. The WaiterInUse list is maintained in the TMF Segment and there is one WaiterInUse list for each CPU. Thus, the WaiterInUse list compiles, for each CPU, a list of transactions each of which has one or more processes waiting to be registered to participate in that transaction.

In the example shown in FIG. 3, there are two transactions, T1 and T2, in process on a particular CPU. Transaction T1 has two processes that are waiting for a Registration response and transaction T2 has one process waiting for such a response.

Figure 4:
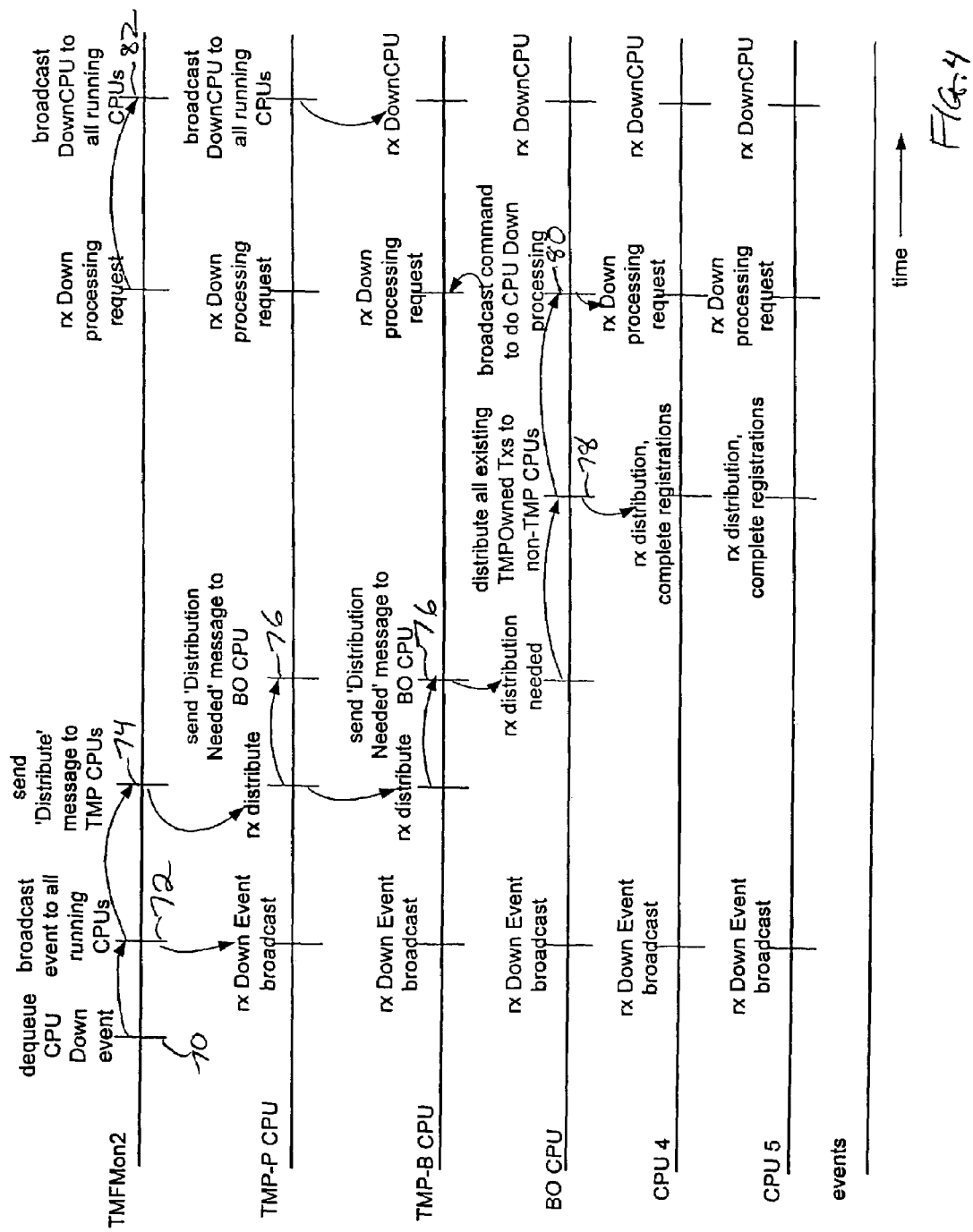
FIG. 4 sets forth a timing chart for the CPU Down Protocol

FIG. 4 sets forth a timing chart for the CPU Down Protocol. Currently, fault-tolerant transaction processing systems have a mechanism for detecting a non-functioning CPU. When a non-functioning CPU is detected, the operating system in the transaction processing system enqueues a 'CpuDown' message in a message queue. The transaction processing system, in each CPU, monitors this queue and processes the entries made to the queue to maintain the fault-tolerant characteristic of the system. One kind of processing is CpuDown Processing, which is set forth in FIG. 4.

In FIG. 4, a coordinating transaction monitor (called the Coordinator TMFMon2) on the TMP-P CPU (the CPU hosting the primary TMP process), dequeues the enqueued 'CPUDown' message 70. A 'DownCPU' message is then broadcast 72 by the library facility (TmfLib) in the TMP-P processing unit to all of the CPUs that the transaction monitor facility (TMF) knows are running.

In response to the 'DownCPU' message, each running CPU that receives the message adds the name of the down CPU to a list in the TCT that tracks the CPUs that are down or are in the process of going down.

Next, the library in the Coordinator TMFMon2 is called to notify 74 the TMP CPUs to distribute all new TMP-Owned transactions. To accomplish this, the following steps are taken.

First, all TMP-Owned transactions are found and a 'DistributionNeeded' message is sent 76, via the PIO facility, to the Broadcast Owner CPU. The PIO facility is a packet I/O facility used for CPU to CPU messaging. Second, the Broadcast Owner CPU distributes 78, in response to the 'DistributionNeeded' message, all of the TMP-Owned transactions to non-TMP CPUs, i.e., processing units not hosting the TMP processes. Also, in this step a 'Flush message' is resent to any CPUs that were not originally participating in the transaction and might not have received a flush request for the transaction. Third, a TCB is created, if one is not already present, in the non-TMP CPUs, for each transaction that was distributed by the Broadcast Owner. If there are any outstanding Registration requests, they are now completed by giving an immediate response. This is done to ensure that a process does not wait indefinitely for a response to its Registration request, a response that may never occur if the Broadcast Owner CPU is the CPU for which the CPUDown processing is occurring.

Next, a broadcast is sent 80 by the Coordinator TmfMon2 to all Libraries in each CPU. The broadcast requests that each CPU perform normal CPUDown processing. This processing includes traversing the WaiterInUse list in each CPU, described above, to determine those transactions that have outstanding (unanswered) Registration Requests. For any list element present, i.e., any transaction on the CPU, if the Broadcast Owner was the CPU for which the Down processing is being performed, the Transaction Registration Request is immediately completed. If the CPU down is not the Broadcast Owner, then the Permission Waiter list for the transaction is traversed to find the processes waiting for registration to work on behalf of the transaction to determine whether the brother CPU (i.e., the backup CPU to the DP2 CPU) is the down CPU. If this is the case, then the Transaction Request is immediately completed to allow the Disk Server Process to process the down state of its brother CPU. Following this, the Disk Processes are "processed for Down condition" and the down CPU is removed from a CPU mask, kept in the library of each CPU, that indicates which CPUs are running. All Disk Process structures that indicate that flush is still needed are processed in each CPU.

At this point, a 'DownCPU' message is sent 82 by the Coordinator TmfMon2 to all of the CPUs the TMF knows to be running. Each CPU receiving the 'DownCPU' message, deletes the down CPU, identified in the message, from the list in the TCT that maintains of all CPUs that are in the process of going down. Thereafter, normal down processing is continued, which includes causing the TMP-P to perform any necessary transaction aborts and to checkpoint its state to its Backup Process.

The result of the above steps is that each running CPU is informed of the down CPU, the system has reverted to the Full Broadcast Protocol, and none of the CPUs is waiting for a response to a Registration Request.

Figure 5A:
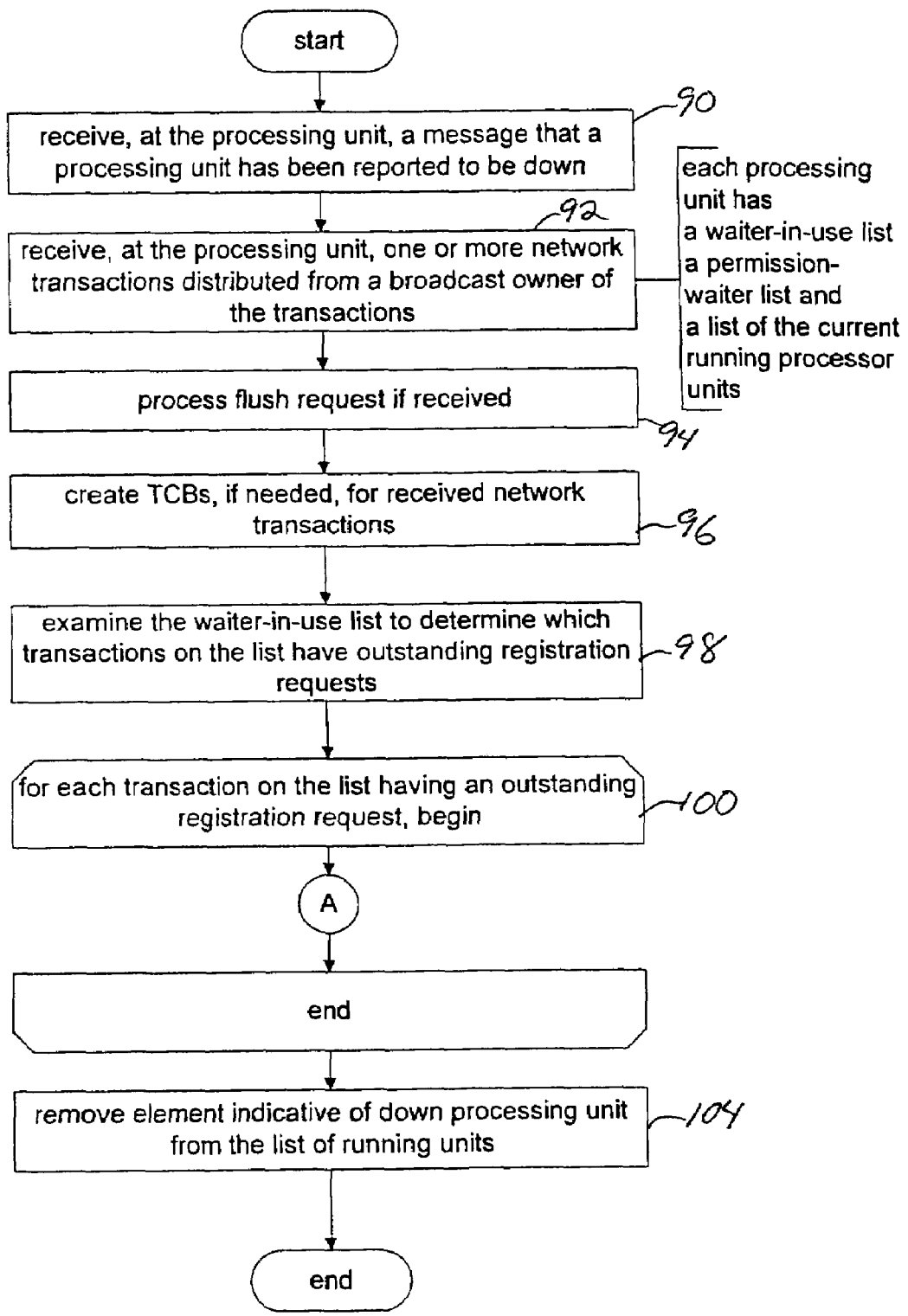
FIGS. 5A and 5B set forth a flow chart of the CPU Down Protocol at a processing unit.
Figure 5B:
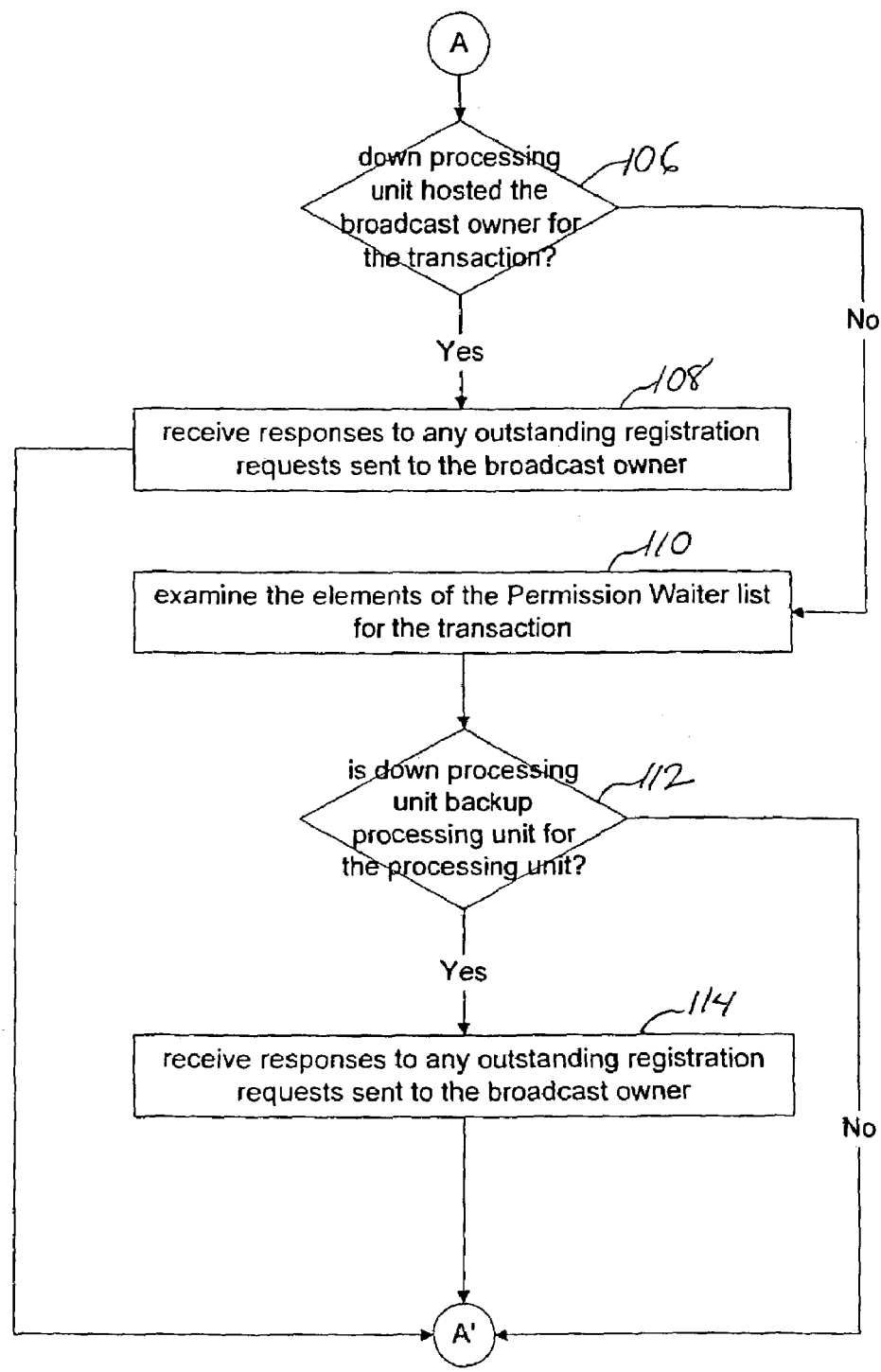

FIGS. 5A and 5B set forth a flow chart of the CPU Down Protocol at a processing unit. In step 90, the processing unit receives a message that one of the other processing units has been reported to be down. In step 92, the processing unit receives one or more network transactions which are distributed from the broadcast owner of the transactions. In step 94, a flush is processed if a flush request is received. If needed, TCBs are created for the received network transactions, in step 96 and in step 98, the waiter-in-use list is examined to determine which transactions on the list have outstanding registration requests. For each transaction on the list having an outstanding registration request, the steps of flow chart 5B are performed (detail A). Finally, in step 104, an element indicative of the down processing unit is removed from the list of running processing units.

FIG. 5B sets forth the steps of Detail A. In step 106, a test is performed to determine whether the down processing unit is one that hosted the broadcast owner for the transaction. If so, then in step 108, the processing unit receives responses to any outstanding registration requests that were sent to the broadcast owner, so that the processing unit does not wait indefinitely for a response. In step 110, the elements of the permission waiter list are examined for the transaction, and in step 112 a test is performed to determine whether the down processing unit is the broadcast owner. If so, then the processing unit receives a response to any outstanding registration request sent to the broadcast owner. If the down unit is a backup to the processing unit, then again the processing unit receives a response to any outstanding registration request to allow the processing unit to process the down state of its backup unit.

Figure 6:
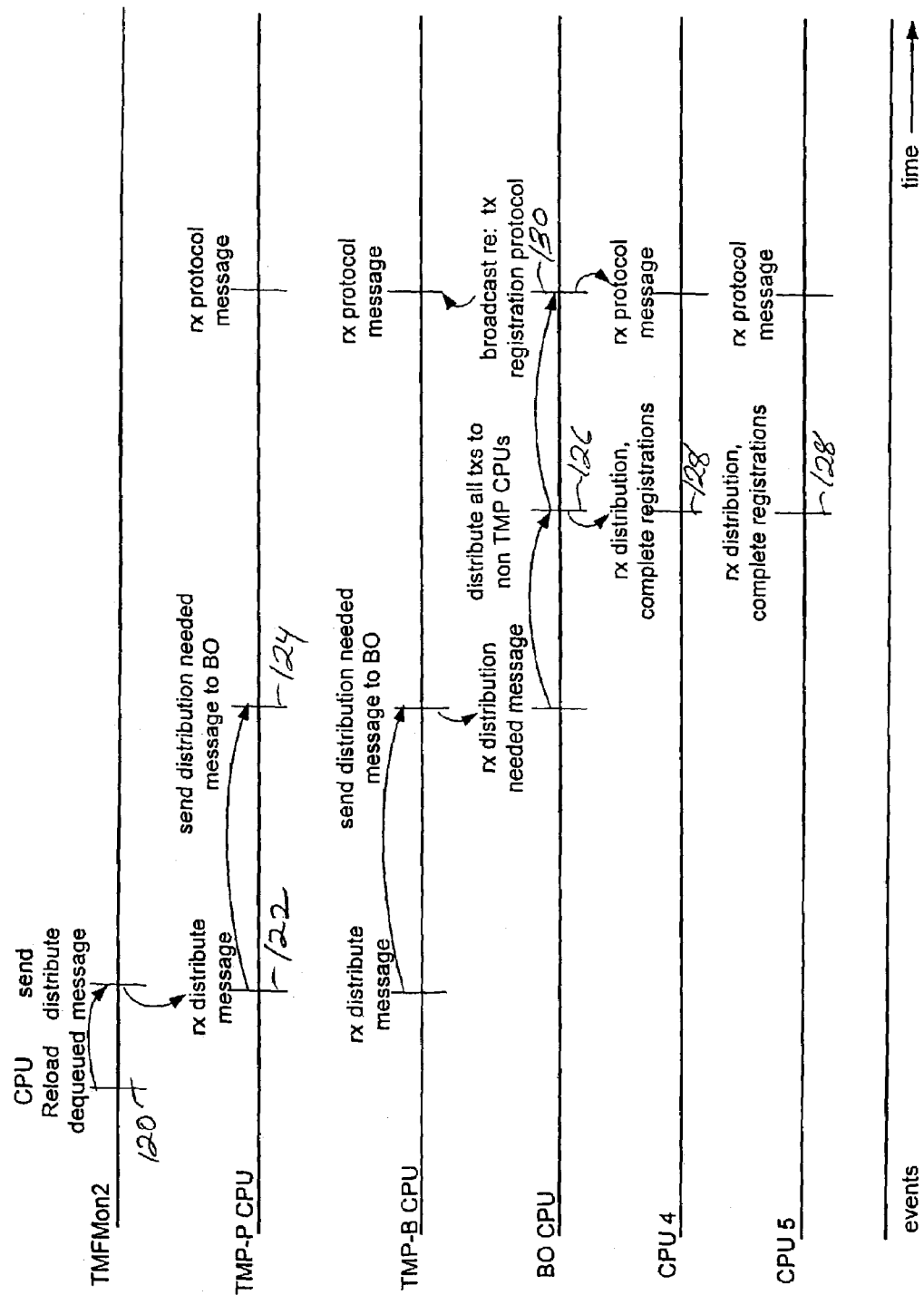
FIG. 6 sets forth a timing chart for the CPU Reload Protocol.

FIG. 6 sets forth a timing chart for the CPU Reload Protocol. This protocol is performed to re-establish a functioning CPU. The protocol is started when a CPUReload event is dequeued 120 by the Coordinator TMFMon2, after which the TMFMon2 sends a message, via the PIO facility, to the TMP CPUs requesting distribution 122 of all new TMP-Owned transactions.

The TMP CPUs receive the message to distribute the new TMP-Owned transactions and, in response, call their respective libraries to distribute all new TMP-Owned transactions by the following steps.

First, all TMP-Owned transactions are found and a 'DistributionNeeded' message is sent 124 to the Broadcast Owner CPU. Second, the Broadcast Owner CPU distributes 126 the found transactions to the non-TMP CPUs. A flush request is also sent at this time to any CPUs that weren't originally participating in each transaction and might not have received the flush request. Third, if there are no TCBs in the CPUs to which the transactions are distributed (meaning that the CPU was not aware of the transactions being distributed, the needed TCBs are created for those transactions. Any outstanding Registration requests are immediately completed 128 (permission is given without a request) to assure that a process attempting to perform work on behalf of the transaction does not wait indefinitely for a response from the Broadcast Owner, a response that may never arrive.

Normal Reload Processing now continues, including reloading the CPU messaging module and while the processing continues, a broadcast is sent out 130 by the Broadcast Owner to all CPUs, including the CPU that is being reloaded, so each CPU has the same information as to whether or not the Registration Protocol is being used. Normal Reload Processing also includes starting the TmfMon2 (the transaction monitor facility for the CPU being reloaded), reloading modules, reloading transactions previously owned by the CPU, reloading Disk Volumes, setting the new Broadcast Owner, and sending a 'Reload Complete' message to the TMP-P so that the TMP-P can checkpoint its state to its backup process.

The result of these steps is that the transaction system has restored a down CPU to functioning status and has distributed all of the transactions so that the system is operating with a Full Broadcast Protocol rather than the Registration Protocol. While the Full Broadcast Protocol is less efficient from the viewpoint of performance, it is only invoked after an CPU failure has occurred.

Figure 7:
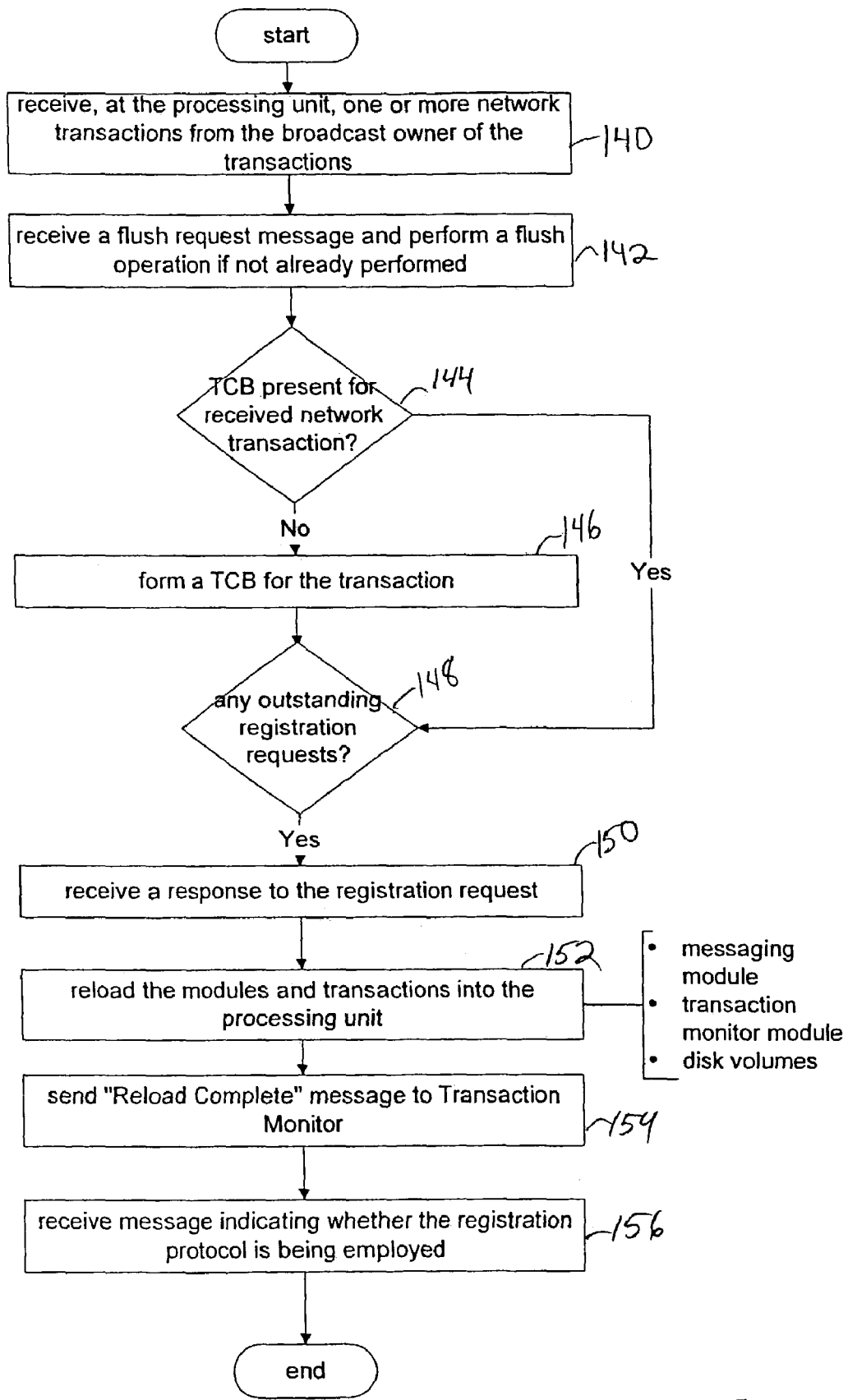
FIG. 7 sets forth a flow chart of the CPU Reload Protocol at a processing unit.

FIG. 7 sets forth a flow chart of the CPU Reload Protocol at a processing unit. In step 140, the processing unit receives one or more network transactions from the broadcast owner of the transactions and a flush request message, in step 142, which it performs if it has not already. If a TCB is not present for a received network transaction as determined in step 144, then a TCB is formed in step 146. Otherwise, if there are any outstanding registration requests, as determined in step 148, then a response is received for those requests, in step 150. In step 152, various modules, such as transaction monitor module, and a messaging module, and transactions are reloaded on to the now operating processing unit. The disk volumes are also reconnected to the processing unit. In step 154 a 'Reload Complete' message is sent to the transaction monitor and in step 156, a message is received to inform the now operating processing unit of which protocol, the Registration Protocol or the Full Broadcast Protocol, is in force.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of handling cluster failures in a transaction processing system operating with a registration protocol, the transaction processing system including a network of interconnected processing clusters, each cluster including a plurality of processing units each having a CPU and volatile storage and access to stable storage, the method comprising:
   receiving, at a processing unit, a message that a processing unit has been reported to be down;
   receiving, at the processing unit, one or more network transactions distributed from a broadcast owner of the transactions, the processing unit having resident thereon, a first list having elements indicative of transactions with outstanding registration requests, a second list having elements indicative of processes waiting for a registration response for a particular transaction, and a third list having elements indicative of currently running processing units;
   examining the elements of the first list to determine which transactions on the list have outstanding registration requests;
   for each transaction on the list having an outstanding registration request,
      if the down processing unit hosted the broadcast owner for the transaction, receiving responses to any outstanding registration requests sent to the broadcast owner; and
      if the down processing unit did not host the broadcast owner,
         examining the elements of the second list for the transaction, to determine whether the down processing unit is a backup processing unit for the processing unit, and
         if the down processing unit is the backup processing unit, receiving responses to any outstanding registration requests to enable the processing unit to process the loss of its backup processing unit; and
   removing the element indicative of the down processing unit from the third list.

2. A method of handling cluster failures as recited in claim 1, wherein the step of receiving, at the processing unit, one or more network transactions from the broadcast owner of the transactions includes:
   determining whether a transaction control block (TCB) is present for each network transaction received;
   if no TCB is present for a transaction, forming a TCB for the network transaction received; and
   if there is an outstanding registration request for any network transaction received, receiving a registration response to the request.

3. A method of handling cluster failures as recited in claim 1, wherein the step of receiving, at the processing unit, one or more network transactions from the broadcast owner of the transactions includes:
   receiving a flush request message; and
   flushing data in volatile storage to stable storage in response to the flush request message.

4. A method of handling cluster failures as recited in claim 1,
wherein each processing unit maintains a fourth list whose elements are indicative of any down CPUs; and
further comprising the step of, after the step of receiving, at a processing unit, a message that a processing unit has been reported to be down, adding to the fourth list an element indicative of the CPU reported down in the received message.

5. A method of handling cluster failures as recited in claim 4, further comprising the step of, after removing the element indicative of the down processing unit from the third list, removing from the fourth list the element indicative of the CPU reported down in the received message.

6. A method of handling a processing unit reload in a transaction processing system operating with a registration protocol, the transaction processing system including a network of interconnected processing clusters, each cluster including a plurality of processing units, each having a CPU and volatile storage and access to stable storage, the method comprising:
receiving, at the processing unit, one or more network transactions from the broadcast owner of the transactions;
determining whether a transaction control block (TCB) is present for each network transaction received;
if no TCB is present for a transaction, forming a TCB for the transaction;
if there is an outstanding registration request for any network transaction received, receiving a response to the registration request;
reloading for the processing unit a transaction monitor module; and
receiving a message indicating whether the registration protocol is being employed.

7. A method of handling a processing unit reload as recited in claim 6, wherein the step of receiving, at the processing unit, one or more network transactions from the broadcast owner of the transactions includes
receiving a flush request message; and
flushing data in volatile storage to stable storage in response to the flush request message.

8. A method of handling a processing unit reload as recited in claim 6, further comprising the step of restarting a messaging module for the processing unit.

* * * * *